March 29, 1927.
R. SERA
LAWN MOWER
Filed June 28, 1924  3 Sheets-Sheet 1
1,622,611
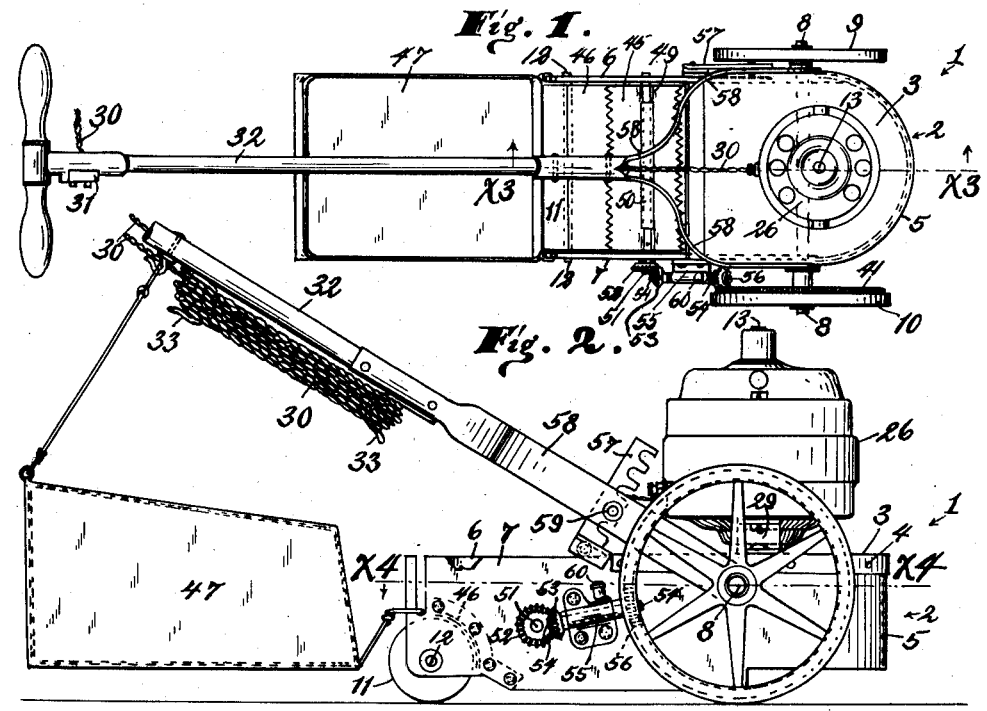
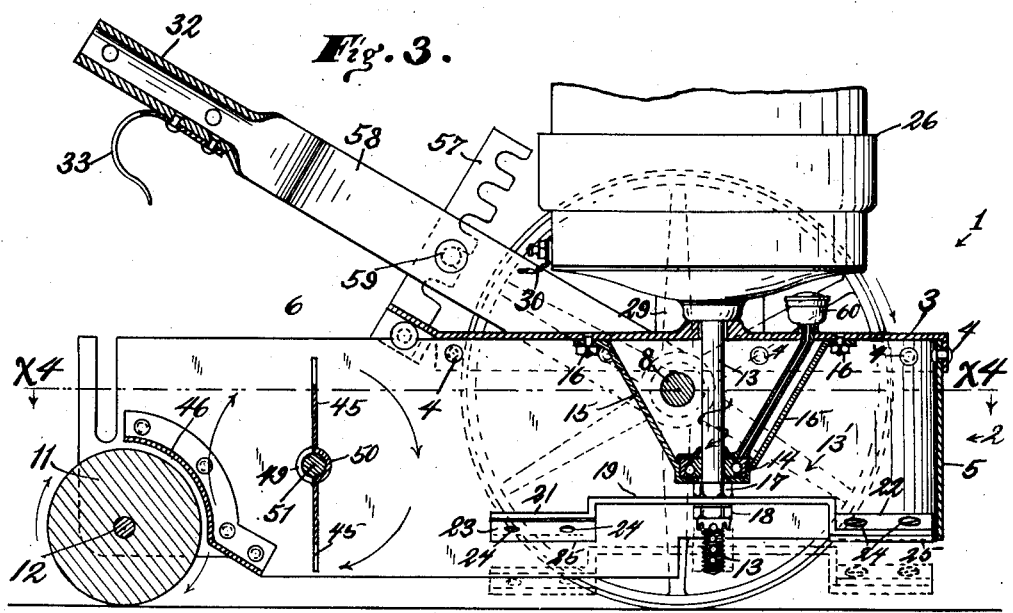
Inventor.
Ryumatsu Sera.
Witness:

March 29, 1927. 1,622,611
R. SERA
LAWN MOWER
Filed June 28, 1924  3 Sheets-Sheet 2
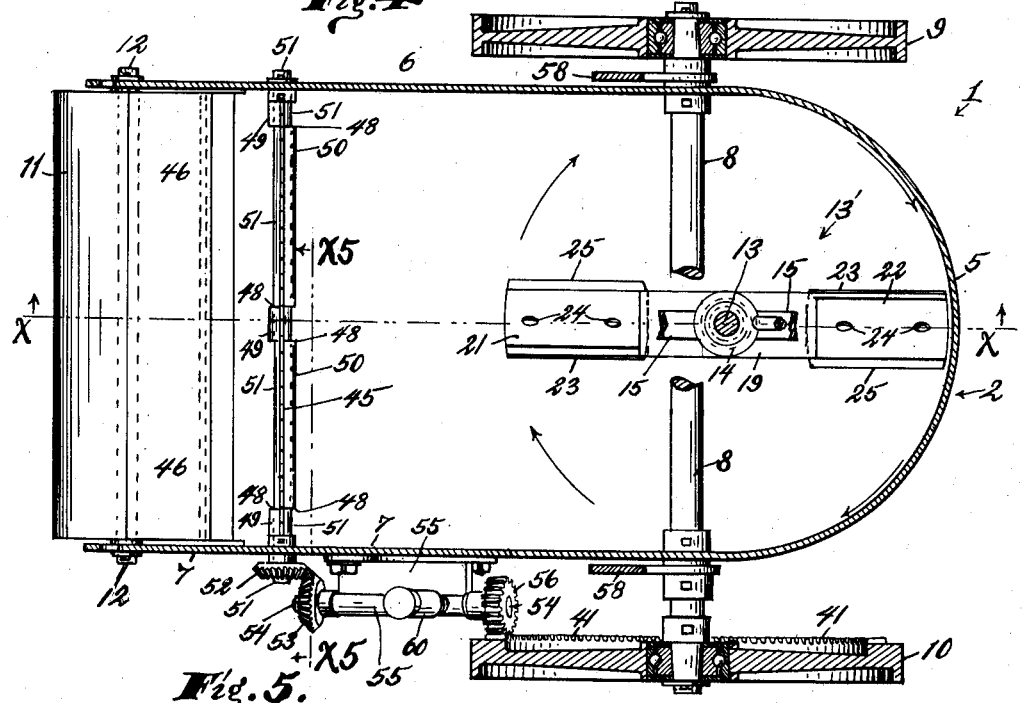
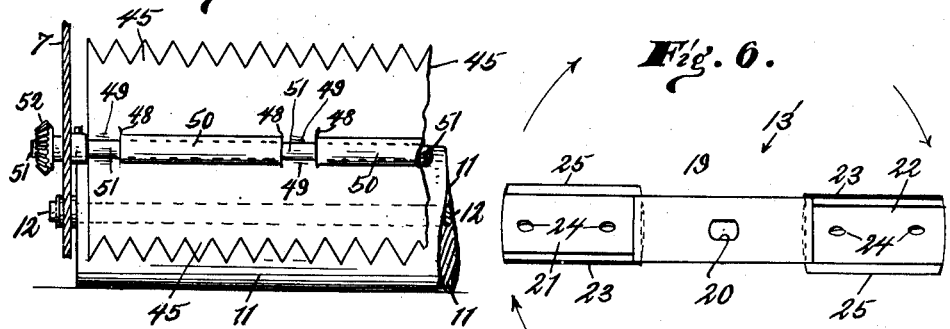
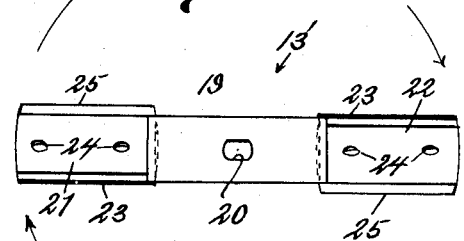
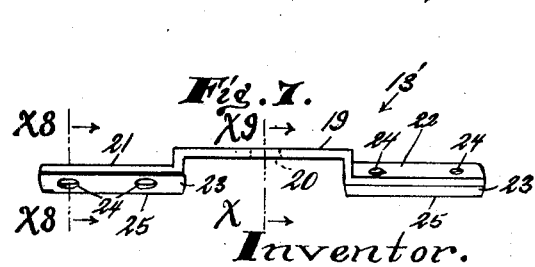
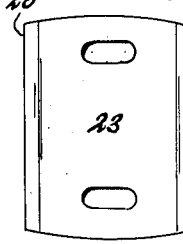
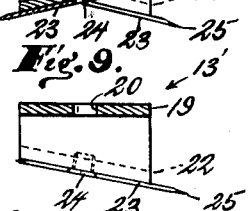
Inventor.
Ryumatsu Sera.
by James R. Townsend
his Atty
Witness:
W. M. Gentle.

March 29, 1927.
R. SERA
LAWN MOWER
Filed June 28, 1924   3 Sheets-Sheet 3
1,622,611
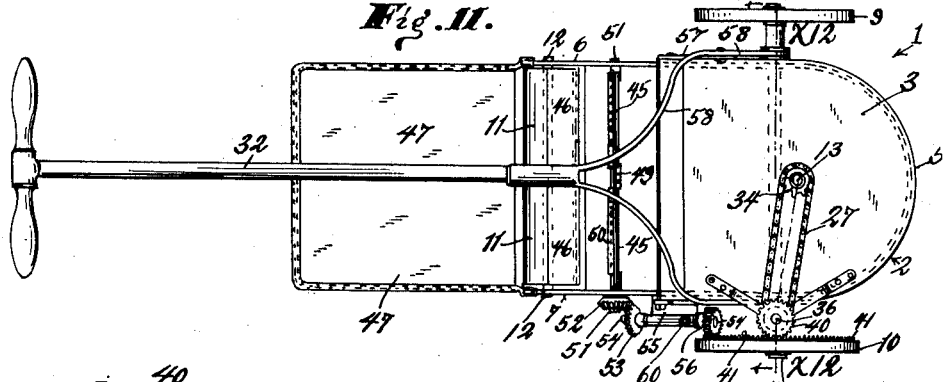
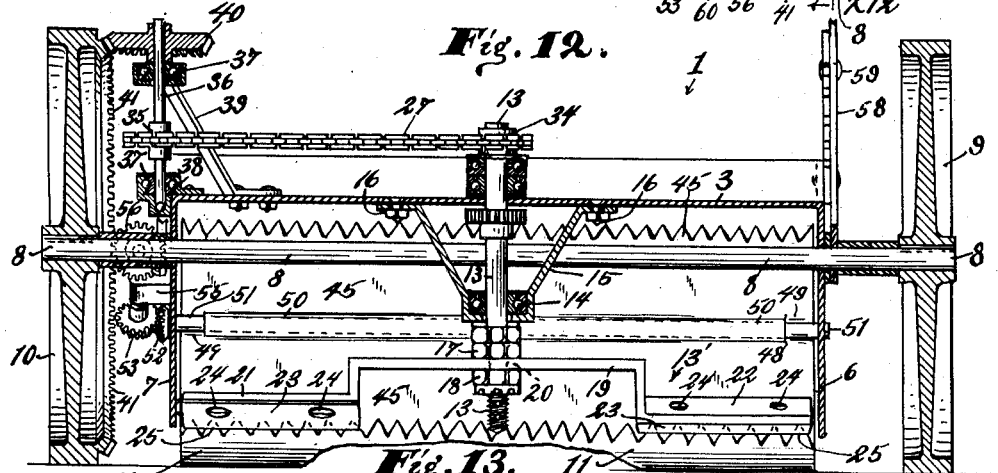
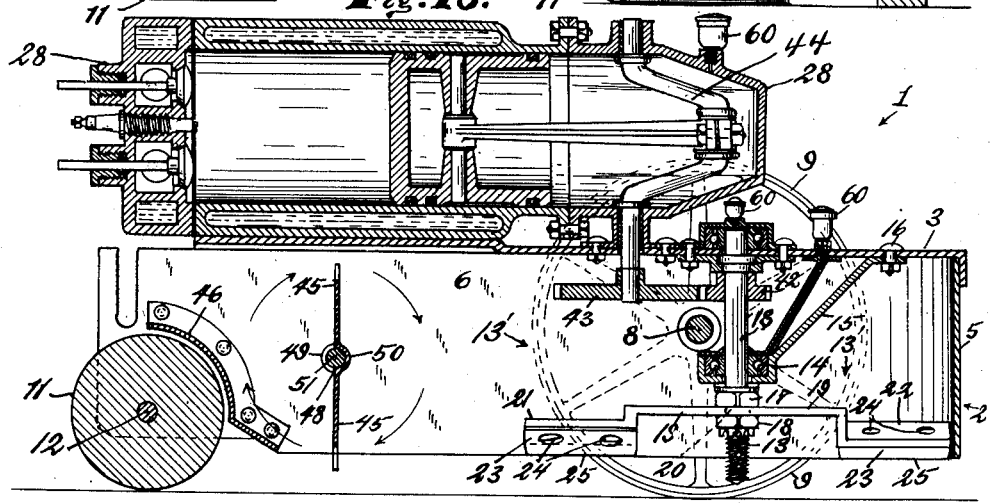
Inventor.
Ryumatsu Sera.
Witness:

Patented Mar. 29, 1927.

1,622,611

UNITED STATES PATENT OFFICE.

RYUMATSU SERA, OF GLENDALE, CALIFORNIA.

LAWN MOWER.

Application filed June 28, 1924. Serial No. 723,036.

This invention relates to a lawn mower having blades adapted to rotate in a horizontal plane and adapted to cut grass in circular swaths; and which can be driven by mechanical or manual means. I provide blades supported by and adapted to be rotated by a vertically arranged shaft that can be driven by an electric motor, hand power or a gas engine so that the cutting edges of the blades lie in a horizontal plane and move around an axis so that they can cut circular swaths.

The invention relates to a lawn mower that will trim a lawn so that all the blades of grass will be cut off at practically the same height from the ground, that is provided with blades adjustable toward or from the ground, so that the lawn can be cut close to or at a considerable distance above the ground, that is also provided with means for driving the blades at a much greater speed than that at which the mower is moved over a lawn, and that has detachable safety razor blades than can be easily removed for sharpening or for replacing with new ones.

Features of invention are shown in the construction combination and arrangement of the parts whereby a lawn mower is provided that is easy to construct and assemble, durable and efficient in operation and which also is neat and pleasing in appearance.

Other objects, advantages and features of invention may appear from the accompanying drawing, the subjoined detailed description and the appended claim.

The accompanying drawings illustrate the invention.

Figure 1 is a plan view of a lawn mower constructed in accordance with this invention.

Fig. 2 is an enlarged side view of the lawn mower showing part of the handle broken away and also showing the electric cable coiled on hooks attached to the handle.

Fig. 3 is an enlarged fragmental section on line $x^3$, Fig. 1, indicating by arrows the direction of rotation of the moving parts when the mower is propelled forward.

Fig. 4 is an enlarged fragmental section on line $x^4$, Figs. 2, 3.

Fig. 5 is a fragmental cross section on line $x^5$, Fig. 4.

Fig. 6 is a plan view of the knife carrier detached from the drive shaft.

Fig. 7 is a side view of the knife carrier shown in Fig. 6.

Fig. 8 is a cross section on line $x^8$, Fig. 7.

Fig. 9 is a cross section on line $x^9$, Fig. 7.

Fig. 10 is a plan view of a razor blade detached from the knife carrier.

Fig. 11 is a plan view of the lawn mower as adapted to have its cutter manually actuated.

Fig. 12 is an enlarged cross section on the staggered line $x^{12}$, Fig. 11.

Fig. 13 is a fragmental longitudinal section through a lawn mower equipped with a gas engine for driving the grass cutter.

The lawn mower comprises a body 1 that is formed of sheet metal plates 2, 3 that are secured together by rivets 4.

The plate 2 has its center portion 5 bent concentric to an axis and its end portions 6, 7 extended rearward and arranged parallel to one another.

An axle 8 is journaled in the end portions 6, 7 adjacent the axis of the portion 5; and secured to this axle are the wheels 9, 10 that are adapted to support the forward end of the body 1.

The rear end of the body 1 is supported by a roller 11 mounted on a bearing rod 12 that is journaled in the end portions 6, 7.

A vertical shaft 13 is journaled through the top plate 3 and has its lower end supported by a ball bearing 14 in a bracket 15 that is secured by bolts 16 to the underside of the plate 3, and this shaft carries the grass cutter 13'.

The lower end of the shaft is threaded for the opposing nuts 17, 18 that are adapted to adjustably secure the knife carrier 19 to the shaft.

The carrier 19 has an opening 20 in the center thereof that is adapted to fit over the shaft; and it is secured thereto as stated so as to rotate with the shaft when it is actuated.

End portions 21, 22 of the carrier 19 are first bent downward and then outward from the center portion so that the blades 23 which are attached thereto by screws 24 are arranged below the center portion; and also the end portions are tilted relative to the center portion so that the edges 25 of the blades 23 are held below the end portions of the carrier, so that only the cutting edge of the blades contacts with a lawn stubble when the mower is in use; and the parts are arranged so that the blades move to cut circular swaths as the mower is moved over a lawn.

The shaft 13 can be driven to rotate the blades 23 by a motor 26 as shown in Figs. 1, 2, 3; by a manually driven chain 27 as shown in Figs. 11, 12 or by an internal combustion engine 28 as shown in Fig. 13.

When driven by the motor 26 the carrier 19 is connected directly to the motor shaft; and the motor is supported on the top plate 3 by brackets 29 as shown in Figs. 2, 3.

The motor 26 can be connected by a cable 30 with a source of electricity not shown. Preferably the cable extends from the source of energy to a switch 31 and then through the mower handle 32 to the motor 26; and when not in use the cable can be coiled on and carried by the hooks 33 secured to the handle 32 as illustrated in Fig. 2.

When the lawn mower is manually operated the shaft 13 is driven as previously stated by a chain 27 in which event a sprocket 34 is secured to the upper end of the shaft 13 that is connected by the chain 27 to a corresponding sprocket 35 on a jack shaft 36 that is supported in the ball bearings 37 that are secured to the plate 3 by the brackets 38, 39. Shaft 36 is connected by a bevel gear 40 with a bevel gear 41 integral with the wheel 10 by which it is driven when the lawn mower is manually propelled on a lawn.

When the shaft 13 is driven by the engine 28 a gear 42 is secured to the shaft 13 in position to mesh with a gear 43 secured to the crank shaft 44 of the engine.

The operation of the engine is well understood; and when it is in action its crank shaft will drive the shaft 13 and rotate the blades 23 so that when the mower is moved over a lawn the grass will be mown as stated.

A saw tooth beater 45 is arranged rearwardly of the shaft 13 in position to lift the severed blades of grass and drive them over the roller guard 46 into a basket 47 carried by the mower.

The beater 45 is preferably formed from a steel plate that is slit at the points 48 so that center portions 49, 50 can be bent outward opposite to one another to form a hub adapted to be fitted on and secured to a shaft 51.

The shaft 51 is driven by means of the bevel gear 41 that is integral with the wheel 10. That is, there is a bevel gear 52 secured to the shaft 51 that meshes with a gear 53 on one end of the jack shaft 54 that is secured to the side 7 by a bracket 55; and on the other end of the shaft 54 is a gear 56 meshing with the gear 41 so that the beater 45 will be driven when the wheel 10 is rotated.

Pivotally connected to the side 6 is a rack 57 that is adapted to hold the yoke 58 of the handle 32 in an elevated position. That is, there is a pin 59 in the yoke 58 that can be fitted in between the teeth of the rack so as to hold it in any desired position.

It is understood that the moving parts can be lubricated by well known means as by the oil cups 60.

I claim:

The lawn mower set forth comprising a body; an axle extending through said body; wheels on said axle; a motor mounted on said body; a vertical shaft extending from said motor; a knife carrier adjustably secured to said shaft; razor blades secured to said carrier; a roller journalled at the rear of said body, a guard in advance of said roller, a saw tooth beater in advance of said guard; and means actuated by said wheels to rotate said beater.

In testimony whereof, I have hereunto set my hand at Los Angeles, California, this 20th day of June, 1924.

RYUMATSU SERA.